United States Patent Office 3,406,990
Patented Oct. 22, 1968

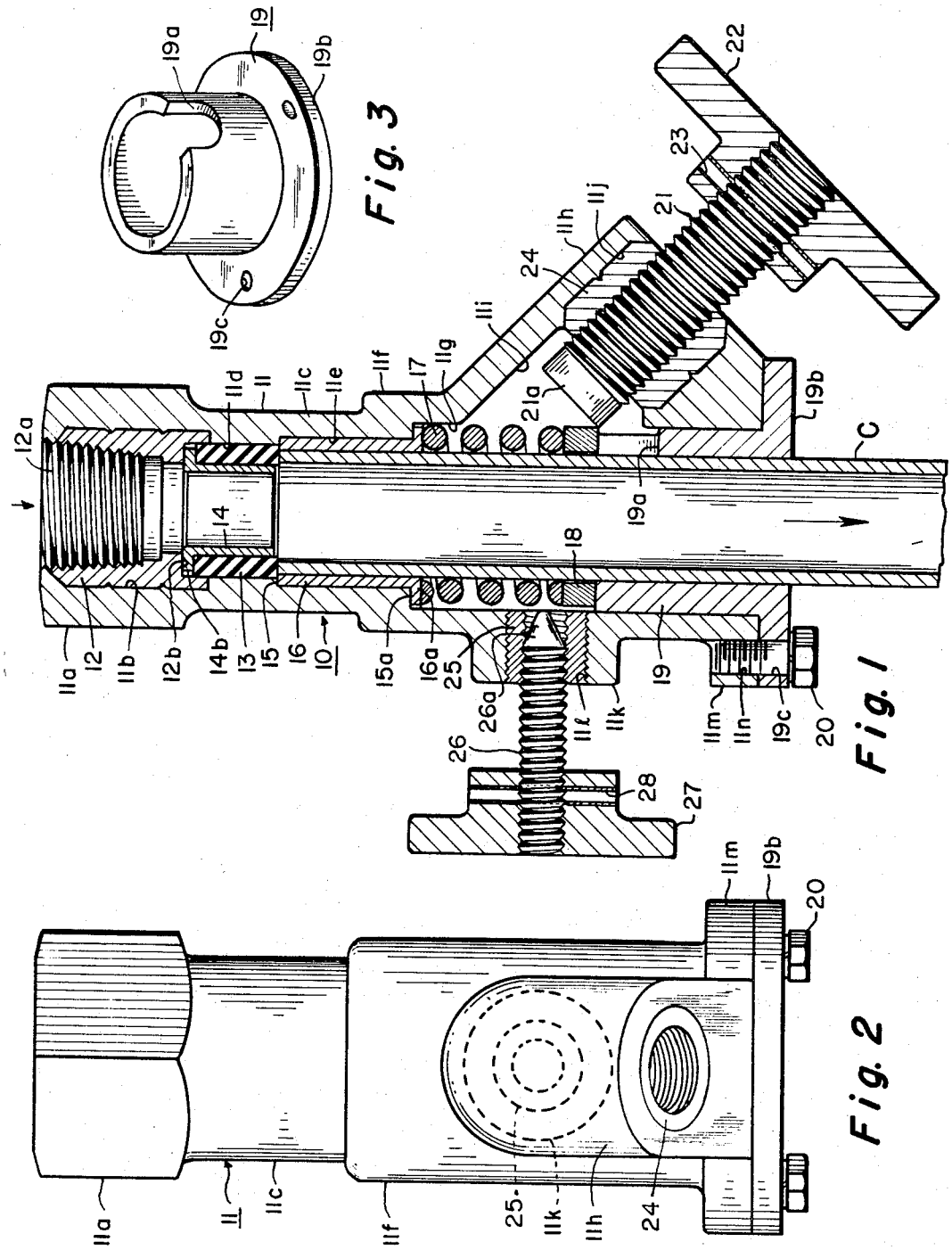

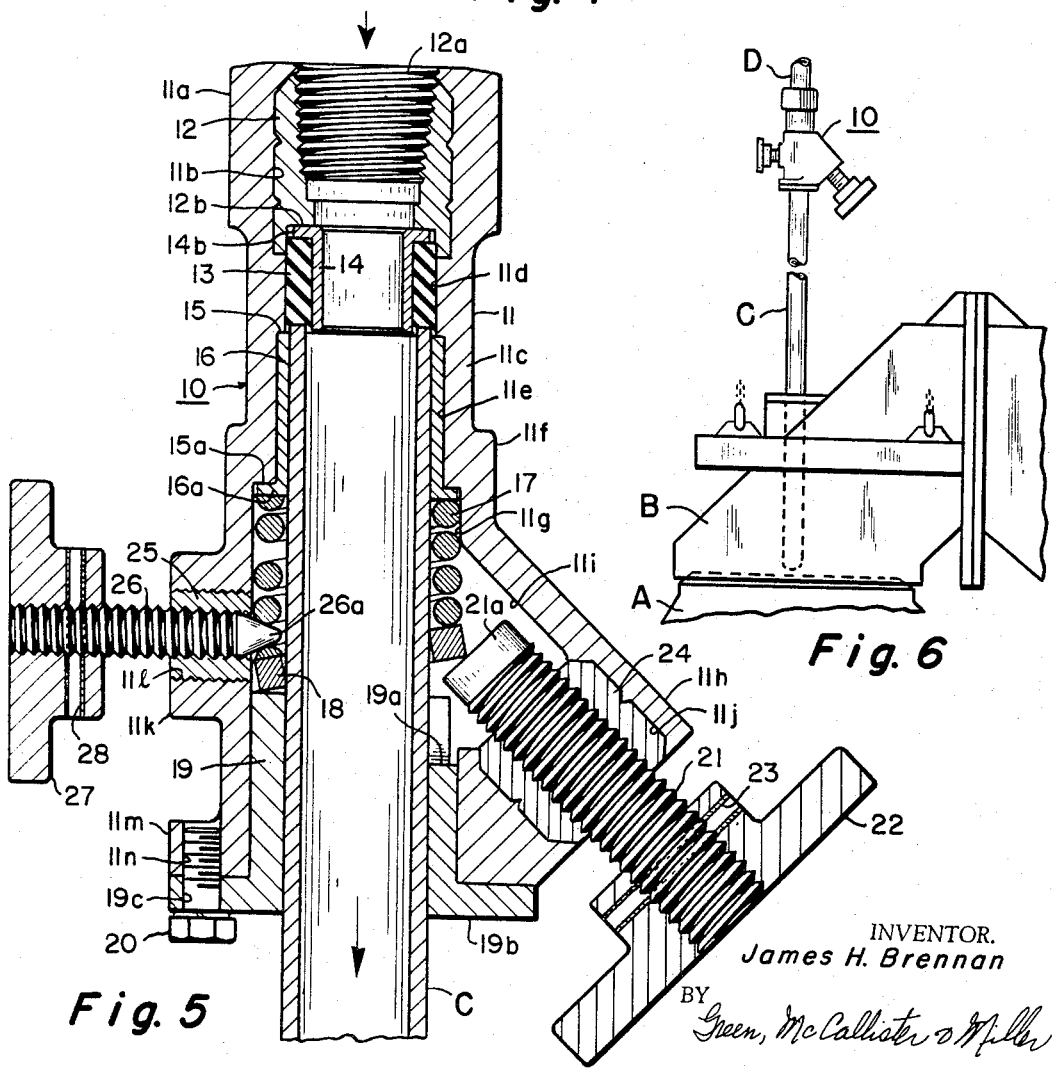

1

3,406,990
OXYGEN LANCE SUPPORT COUPLING
James H. Brennan, 65 Parkridge Lane,
Pittsburgh, Pa. 15228
Continuation of application Ser. No. 491,317, Sept. 29, 1965. This application Nov. 1, 1967, Ser. No. 683,087
10 Claims. (Cl. 285—310)

ABSTRACT OF THE DISCLOSURE

A quickly latching and releasable coupling for a smooth wall tubing member, such as an oxygen blowing lance for a BOF furnace, is provided that uses a locking spring and a ring assembly to receive the member. A cant screw is adapted to move a portion of the ring backwardly against force exerted by the spring of the assembly into a canted locking relation with respect to the member. A safety screw is adapted to engage the assembly to prevent an opposite portion of the ring from moving, as under a jarring force, from a forward position to a backward position at which the ring will lose its canted locking relation.

---

This invention relates to a coupling for carrying, supporting or suspending a pipe, conduit or tubing member and particularly, to a coupling for carrying, suspending or supporting an oxygen lance, such as used for supplying oxygen or a mixture of gases to an open hearth, electric, oxygen converter or other type of metal melting and refining furnace. This application is a continuation of application S.N. 491,317 filed Sept. 29, 1965, and now abandoned.

A coupling for the above type of employment should have a quick locking and release type of operation to facilitate replacement of the gas blow lance, pipe or nozzle member, since the lower portion of the lance is gradually consumed due to the heat generated and thus, one or more lances may be required for a single so-called oxygen blow or for supplying oxygen gas to one so-called furnace charge or heat. Difficulty has been encountered in providing a coupling that will both provide a fully leakproof connection to a gas supply main and a positive retention of the pipe or nozzle, when, for example, the assembly is subjected to customary rough usage.

In couplings heretofore available, there has been a tendency for the lance or pipe member to be inadvertently loosened or released when the assembly is hit or subjected to a hard knock or blow.

It has thus been an object of my invention to devise a coupling that fully meets requirements of a lance connector-holder and that solves the problem of inadvertent release of the lance;

Another object has been to provide an improved positive-seal, quick-release coupling of a lance or pipe member supporting or holding type;

A further object has been to provide a lance supporting or suspending coupling that is positive and foolproof in its holding action, and irrespective of rough usage to which is may be subjected;

These and other objects of my invention will appear to those skilled in the art in view of the illustrated embodiment and the claims.

In the drawings,

FIGURE 1 is a full scale view in section, taken vertically or longitudinally through a coupling unit of my invention, and showing positioning of elements or parts thereof after a lance or pipe member has been initially slidably-inserted and before it is locked or secured in position therein;

2

FIGURE 2 is a vertical or longitudinal view on the scale of an showing the outside of the unit of FIGURE 1, with the unit turned 90°, and with locking screw parts removed;

FIGURE 3 is a reduced perspective view in elevation showing details of the construction of a flanged end cap or collar part of the coupling unit of FIGURES 1 and 2;

FIGURE 4 is a bottom plan end view on the scale of and of the unit assembly of FIGURE 1;

FIGURE 5 is a sectional view on the same scale as and similar to FIGURE 1, but showing the lance or pipe member in a sealed-off, connected and locked-in, final position within the coupling unit;

And FIGURE 6 is a greatly reduced fragmental side view in elevation illustrating an application of the coupling and lance assembly of FIGURE 5.

In accordance with my invention, I provide a quickly-detachable coupling unit 10 whose upstream end is, as shown in FIGURE 6, adapted to be threadably-connected at its upstream or back end to an oxygen or gas supply line, pipe or connector end of a flexible hose D and to, in turn, support or carry an oxygen supply lance, nozzle or pipe member C in a projecting relation from its forward or downstream end.

In FIGURE 6, the lance C is shown extending through an opening in an exhaust hood B that is positioned over the mouth of a converter vessel or furnace A in an above-positioned "ready" position to be lowered into the vessel for blowing a metal charge therein. The lance C may be about twenty feet in length, may or may not have a nozzle on its discharge or downstream end, and will usually have an outer diameter of up to about one inch. The lance C may also be used by inserting it through the side of an electric furnace, or through the roof or side of an open hearth furnace. The assembly may be suspended overhead in a plant or carried on a suitable cart.

The coupling unit 10 eliminates the need for threading the end of the oxygen lance C and makes possible the use of a plain or smooth-wall pipe or lance member. It connects the gas or oxygen line in a matter of seconds in a fully fluid sealed-off relation, and positively and securely holds the lance in a coupled relation with respect thereto.

With particular reference to FIGURES 1 to 3 of the drawings, I have shown a housing body 11 having a through-extending longitudinal bore therein. The upstream or inlet end of the housing 11 has means for re-movably-securely connecting its bore to a gas supply line, shown as having a slightly enlarged boss or inlet connector portion 11a. As disclosed in FIGURE 2, the outer surface of the portion 11a may have a wrench flat for facilitating connecting it to the supply pipe D. The inlet connector portion 11a has a bore portion 11b within which an internally-threaded bushing, grommet or sleeve insert 12 is securely mounted. In this connection, it will be noted that the upper end of the portion 11a is upset-inwardly and that the bore portion 11b and the grommet 12 have cooperating tongue and groove connections. The grommet 12 has a tapered or inwardly-converging threaded bore 12a which is adapted to cooperatively-receive and to be securely-removably mounted on a threaded male end of the supply pipe D. Connecting body portion 11c of the housing 11 is shown of cylindrical shape and as extending from the wrench-flat-shaped, upper boss portion 11a to a lower, slightly enlarged, lower body portion 11f which, as shown particularly in FIG-URES 2 and 3, is connected on one side to an outwardly-projecting, angular, screw-mounting, forward boss portion 11h and, on its opposite side, to a screw-mounting, circular boss 11k.

It will be noted that the bore portion 11b, at its forward end, terminates in a ledge which with the inner end of the grommet 12 engages and is connected by a slightly smaller diameter bore portion 11d, to an enlarged central bore portion 11e of the central body portion 11c. The angular-shaped boss portion 11h has a bore 11i which is open-inwardly to the bore 11e through a radially-enlarged spring-receiving bore portion 11g, and is open-forwardly to a grommet-receiving bore 11j. The boss 11k is provided with a grommet-receiving bore 11l that is also also open to the spring-receiving bore portion 11g.

The lower body portion 11f terminates at its forward or downstream end in an outwardly-projecting bottom flange 11m which surmounts its downstream open end portion. It will be noted that the flange 11m is provided with peripherally spaced-apart threaded openings 11n for threaded receiving bolts 20 to removably-secure a downstream flanged end cap 19 in position, as shown particularly in FIGURE 1.

The bore portion 11d carries a sleeve-like, resilient, annular gasket, washer or sealing bumper 13 therein which may have about a 60 hardness. At its upper or upstream end, the sleeve gasket 13 rests against the underside of an outwardly-projecting flange portion 14b of a loose-grommet bushing or positioning sleeve 14. It will be noted that the upper side of the flange 14b rests against an abutment face 12b of an offset lower end portion of the fixed grommet 12, and that the positioning sleeve 14 extends along and supports the inner periphery of the sealing gasket 13 to terminate a short distance from its lower end (see FIGURE 1).

A slide sleeve element or part 16 is slidably-fit within intermediate bore portion 11e of the housing 11 to, at its upper end, abut against an upper ledge 15 that lies between the bore portions 11d and 11e. At its lower end, the slide sleeve 16 has a radially-outwardly-projecting annular flange 16a which rests on its upper side against a ledge portion 15a defined between the bore portion 11e and the spring-receiving bore portion 11g.

A locking, spiral tension spring 17 is operatively-positioned within the bore 11g to, at its upper end, abut against the lower face of the flange 16a and to, at its lower end, abut against a cant or annular locking ring 18 (shown of square cross-section). The ring 18 rests on the inner or end edge of the sleeve portion of front end closure cap 19. As shown particularly in FIGURES 1 and 3, annular, transversely or radially projecting flange portion 19b of the cap 19 has peripherally spaced-apart bore holes therethrough to bypass the threaded bolts 20 which are secured in position within the flange portion 11m of the housing. As shown particularly in FIGURES 1 and 3, the closure cap 19 has an open-side slot 19a to bypass an adjustable locking means in the form of a side-mounted, locking screw or stem 21.

On the right side of the housing 11 in FIGURES 1 and 5, the angular-shaped boss portion 11h has a bore 11j which is adapted to securely-receive and mount a bearing insert or grommet 24. As shown, the grommet 24 and the bore 11j may have a complementary tongue and groove interfitting relation to securely retain the grommet in position within the bore. The grommet 24 has a centrally-threaded bore therethrough to adjustably-receive the locking screw or threaded stem 21 therein. The screw 21, which may also be termed a cant screw, is provided with an operating head portion 21a at its inner end that is shown of a circular configuration with a flat end. The head 21a is adapted to engage the cant ring or annulus 18. At its outwardly-projecting end portion, the screw 21 has a hand wheel 22 secured thereon by means of a through-extending lock sleeve 23.

The opposite side boss portion 11k is shown as having its central bore 11l threaded to removably-receive a bushing or grommet 25 therein. The bushing 25 is internally-threaded to adjustably-receive a safety-lock screw or threaded stem 26. The stem 26, at its inner end, has a forwardly-converging cone or wedge-shaped head 26a that is adapted to be moved into and out of wedging engagement between adjacent convolutions of the locking spring 17 adjacent the ring 18 (compare FIGURES 1 and 5) to retain the ring in position against the inner end of the sleeve-like portion of the end cap 19. The head 26a may also move between the ring 18 and a forward convolution of the spring 17 (not shown). Like the lock screw 21, the safety screw 26 is provided with a hand wheel 27 mounted on its outwardly-extending end and secured thereto by a through-extending locking sleeve 28.

In employing the coupling unit 10 of my invention, the inlet or upstream end of the lance or pipe member C is endwise slid or inserted, as shown in FIGURE 1, through the central opening in the flanged cap 19 and along its sleeve-like portion, through the cant ring 18, along the inner diameter of the spring 17, and within and along the slide sleeve 16, until its forward end or edge lies adjacent to or abuts an end sealing face or seat of the sleeve-like gasket 13. When this has been accomplished, the pipe member C and the various operating parts of the unit 10 bear the relationship shown in FIGURE 1.

To secure the pipe member C in a fluid sealed-off relation within the coupling 10, the hand wheel 22 of the locking screw 21 is then tightened-down to the position shown in FIGURE 5, in such a manner that its head 21a cants one portion or side of the ring 18 which is loosely-positioned on the outer diameter of the lance or pipe member C, so as to compress an adjacent side of convolutions of the spring 17 towards each other. The frictional engagement of the ring 18 with the pipe member C during the backward canting of its one side, provides an inward movement of the pipe member C, such that its inner edge or end is now tightly-sealed against the sealing end of the gasket 13, and the gasket 13 tightly seals-off the joint within the unit 10. There is thus no possibility of fluid leakage. This inward movement will normally be about $\frac{1}{16}$ to $\frac{3}{32}$ of an inch. It will be noted that, even if the end of the pipe member C is not initially fully manually pushed into abutting engagement with the sleeve gasket 13, the operation of the screw 21 accomplishes it by causing a further inward movement of the pipe member over and above the approximately $\frac{3}{32}$ inch movement which is employed to provide the sealing-off action.

Although the above inward movement of the screw 21 tends to lock the pipe member C in a fluid sealed-off position within the unit 10, I employ safety screw 26 which, as shown in FIGURE 5, is screwed-in between a pair of adjacent convolutions of the spring 17, so as to positively retain the mechanism in a canted, locked position, irrespective of whether or not the coupling is hit a hard blow. That is, a hard blow, without the use of the safety screw 26, tends to cause the ring 18 to lose its cant, i.e., move backwardly away from the end of the sleeve-like portion of the cap, opposite the portion engaged by the locking or canting screw 21. When the cant of the ring 18 is thus lost, it cannot be regained until the screw 21 is withdrawn and then again advanced. As a result, the pipe member C will be released and will tend to slip-out.

By way of example, the housing 11, the cap 19 and the hand wheels 22 and 27 may be of a suitable metal, such as aluminum, aluminum bronze or brass, the parts 12, 14, 16, 17 and 24 of bronze or steel, the parts 20, 23, 25 and 28 of steel or iron, and the part 13 of a natural or resin rubber. The grommets 12, 24 and 25 may, if desired, be cast in their respective mounting bores.

It will be noted that the sleeve 14 serves to reinforce or maintain the shape of the gasket with the bore 11d by supporting it along its inner wall or diameter. It will also be noted that the lower end or seating face of the gasket 13 has a greater width and inner diameter than the slide sleeve 15, but that a portion of the end of the slide sleeve 16 retains the gasket 13 in position, as shown in FIGURE 1, both when the pipe member C is withdrawn and is initially inserted. After the pipe member C has been fully inserted into a sealing-off relation with the end seating face of the gasket 13, as shown in FIGURE 5, it will be apparent that the gasket is, in effect, compressed along its longitudinal axis or length; it is shown as slightly withdrawn from engagement with the back end or edge of the slide sleeve 16 and slightly behind the forward edge of the positioning sleeve 14.

The spring 17 functions to normally retain or resiliently urge the annular ring 18 towards or into engagement with the end of the sleeve-like portion of the cap 19; it also normally tends to resist follow-up or backward movement of the side portion of the ring 18 when its opposite side portion is engaged and canted backwardly against the resiliency of the spring by the latching means 21. The safety or positive retention means 26 cooperates with the portion or side of the ring 18 which is opposed to the canted side to positively retain such portion in its forward or engaging position with respect to the end of the sleeve-like portion of the closure cap 19. The spring 17 is free to return the ring 18 to its uncanted or planar, pipe-releasing position of FIGURE 1 automatically, when the latching means 21 is withdrawn or screwed forwardly-outwardly from the position of FIGURE 5 to the position of FIGURE 1, and irrespective of whether or not the safety lock means 26 is or is not in its inner engaging position of FIGURE 5.

It will be further noted that the sleeve-like portion of the cap 19 and the slide sleeve 16 have inner diameters that substantially correspond to the outer diameter of the pipe member C, in order to that the latter may be freely slid into and out of position within the bore of the longitudinal housing 11 when the latching means 21 is released. The construction of my coupling 10 is such that its inner parts, such as 13, 14, 15, 16, 17 and 18 may be easily inserted and removed from the forward end of its longitudinal bore by removing the end cap 19. This facilitates the maintenance of the construction.

Although for the purpose of illustration, I have shown a suitable construction embodying my invention, it will be apparent to those skilled in the art that various modifications may be made without departing from its spirit and scope as indicated by the appended claims.

I claim:

1. A quickly-detachable locking type of fluid sealing-off coupling for connecting an end portion of a fluid carrying pipe member to a fluid supply line which comprises, a longitudinally-extending coupling housing having a through-extending bore, means mounted within a back end portion of said bore for securely-connecting it to the fluid supply line, an annular gasket positioned in a back end portion of said bore adjacent said means, means cooperating with said gasket to support it in position within said bore for defining a forwardly-exposed end seat portion about said gasket, a front closure cap mounted on a forward end portion of said housing and having a backwardly-projecting sleeve-like portion extending along said bore, an annular ring resting on the back end of said sleeve-like portion, a tension spring operatively-positioned within said bore to resiliently hold said ring in abutment with the back end of said sleeve-like portion, safety means carried by said housing and projecting into said bore and cooperating with said spring to positively lock and maintain and adjacent portion of said ring securely in position against the back end of said sleeve-like portion, and cant screw means operatively-carried by said housing and having a head constructed to project in said bore and engage a transversely opposite portion of said ring in an angular relation to move the opposite portion backwardly against the tension of said spring into a canted relation within said bore, and with respect to the positively locked portion of said ring.

2. A quickly-detachable locking type of fluid sealing-off coupling as defined in claim 1 wherein, said cap has a forward flange portion cooperating with a forward end of said housing, and means cooperates with said forward flange portion and said housing for removably-securing said cap in position on said housing.

3. A quickly-detachable locking type of fluid sealing-off coupling as defined in claim 1 wherein said sleeve-like portion, said spring and said means for positioning said gasket define inner wall portions for slidably-receiving the end portion of the pipe member within said housing and for passing its back end into an adjacent position with the end seat of said gasket.

4. A quickly-detachable locking type of fluid sealing-off coupling as defined in claim 3 wherein, means adjustably positions said cant screw to extend angularly within said housing, whereby said head will frictionally-advance the opposite portion of said ring into a canted relation with respect to and on the pipe member, and said ring during such canting movement is adapted to advance the back end of the pipe member into a tight fluid sealing-off engagement with the end seat of said gasket.

5. In a quickly-detachable locking type of fluid sealing-off coupling for connecting an end portion of a fluid-carrying pipe member to a fluid supply line which comprises, a longitudinally-extending coupling housing having a through-extending bore, means at a back end of said housing for securely-connecting the back end of said bore to the fluid supply line, an annular gasket positioned in said bore forwardly of said means, a slide sleeve positioned in said bore in partial longitudinal endwise alignment with and forwardly of said gasket and having a larger inner diameter than said gasket, a tension spring positioned in said bore in longitudinal alignment with and forwardly of said slide sleeve to at its back end abut the forward end of said sleeve, a locking ring loosely-positioned in said bore to abut the front end of said spring, a cap removably-secured on a forward end portion of said housing and having a sleeve portion extending backwardly along said bore to position said annular ring therein; said slide sleeve, spring, annular ring and sleeve portion being adapted to slidably-receive the end portion of the pipe member therein and pass its end into a substantially abutting position with said gasket; adjustably cant screw means operatively-carried by said housing and having a head positioned to engage a portion of said ring in an angular relation and cant such portion into a locking-canted relation about the pipe member against the force exerted by said spring and hold the pipe member in fluid sealing-off abutment with said gasket, and safety lock means operatively-carried by said housing in a transversely opposed relation with respect to said adjustable cant screw means for movement into and out of a positive holding position with respect to an opposite portion of said ring for securely locking and maintaining the opposite portion of said ring in a fixed abutting position with the inner end of said sleeve portion and against release of the canted relation of said ring.

6. In a quickly-detachable locking type of fluid sealing-off coupling for connecting an end portion of a fluid-carrying pipe member to a fluid supply line which comprises, a longitudinally-extending coupling housing having a through-extending bore, means at a back end of said housing for securely-connecting the back end of said bore to the fluid supply line, an annular gasket positioned in said bore forwardly of said means, a slide sleeve positioned in said bore in partial longitudinal endwise alignment with and forwardly of said gasket and having a larger inner diameter than said gasket, a tension spring positioned in said bore in longitudinal alignment with and forwardly of said slide sleeve to at its back end abut the forward end of said sleeve, a locking ring loosely-positioned in said bore to abut the front end of said spring, a cap removably-secured on a forward end portion of said housing and having a sleeve portion extending backwardly along said bore to position said annular ring therein; said slide sleeve, spring, annular ring and sleeve portion being adapted to slidably-receive the end portion of the pipe member therein and pass its end into a substantially abutting position with said gasket;

adjustable locking means operatively-carried by said housing to engage a portion of said ring and cant it into a locking-canted relation about the pipe member against the force exerted by said spring and hold the pipe member in fluid sealing-off abutment with said gasket, safety lock means operatively-carried by said housing in an opposed relation with respect to said adjustable locking means for movement into and out of a holding position with respect to an opposite portion of said ring for positively retaining the opposite portion of said ring in a fixed abutting position with the inner end of said sleeve portion, and said safety lock means having a wedge-shaped head to engage between convolutions of said spring at the forward end thereof to force a forward convolution of said spring into tight holding abutment with an adjacent portion of said ring.

7. A quickly-detachable locking type of fluid sealing-off coupling for connecting an end portion of a fluid-carrying pipe member to a fluid supply line which comprises, a longitudinally-extending coupling housing having a bore extending therealong from a back end to a forward end of said housing, means at the back end of said housing for securely-connecting the back end of said bore to the fluid supply line, an annular gasket positioned in said bore adjacent the back end thereof, a sleeve-like means extending along an inner diameter of said gasket for positioning it within said bore, a slide sleeve having a greater inner diameter than said gasket positioned in said bore to abut a forward end of said gasket and hold it against forward movement in said bore, a tension spring positioned in said bore in longitudinal alignment with said slide sleeve to hold said slide sleeve in engagement with said gasket, a locking ring loosely-positioned in said bore at the forward end of said spring to cooperate therewith, a cap removably-secured to said body at its forward end portion and having a sleeve portion extending backwardly along said bore to position said locking ring in a cooperating relation with said spring; said slide sleeve, spring, locking ring and sleeve portion being adapted to slidably-receive the end portion of the pipe member therein and pass its end portion into a cooperating adjacent position with the forward and of said gasket; locking means operatively-carried by siad housing to engage a portion of said ring and advance it backwardly along the pipe member against the resiliency of said spring into a canted relation, said ring during its movement into a canted relation being adapted to advance the pipe member into tight fluid sealing-off abutment with the forward end of said gasket, and safety means operatively-carried by said housing to lock an opposite portion of said ring in position against said sleeve portion and maintain such opposite portion of said ring against backward sliding movement with respect to the pipe member and release of it from its canted relation.

8. A quickly-detachable locking type of fluid sealing-off coupling as defined in claim 7 wherein, said means for securely-connecting the back end of said bore to the fluid supply line comprises, an internally-threaded grommet securely-mounted within an enlarged back end portion of said bore, said annular gasket is of sleeve-like construction and is positioned within a slightly enlarged portion of said bore, said sleeve-like means has an outwardly-projecting flange at its back end to abut said threaded grommet and receive a back end portion of said gasket in abutment therewith, said slide sleeve is positioned in a portion of said bore that is enlarged with respect to the portion within which said gasket is positioned, said spring is positioned in a further enlarged portion of said bore, said slide sleeve has an outwardly-projecting flange at its forward end to abut the back end of said spring within said further enlarged portion of said bore, and said sleeve-like portion of said cap is positioned within said further enlarged bore in abutment with said annular ring.

9. A quickly-detachable locking type of fluid sealing-off coupling as defined in claim 7 wherein, said housing has an angular boss portion projecting forwardly thereof at its forward end portion, said angular boss-like portion has an internally-threaded grommet securely positioned therein, and said locking means is a threaded stem adjustably-mounted within said threaded grommet to project along said angular boss-like portion into cooperative abutment with a portion of said ring.

10. A quickly-detachable locking type of fluid sealing-off coupling as defined in claim 7 wherein, said housing has a side boss portion provided with a transverse bore therein open to said longitudinal bore, an internally-threaded grommet is threadably secured in said transverse bore, and said safety means is a screw adjustably-positioned within the threaded bore of said grommet and having a cone-shaped forward end portion to engage between adjacent convolutions of said spring.

References Cited

UNITED STATES PATENTS

| 1,831,856 | 11/1931 | Fullman | 285—340 X |
| 1,889,868 | 12/1932 | Montgomery | 285—375 |
| 2,401,351 | 6/1946 | Herbst et al. | 287—53 |
| 2,691,537 | 10/1954 | Bashark | 285—340 |
| 2,805,873 | 9/1957 | Brennan et al. | 285—353 |
| 3,061,869 | 11/1962 | Scalo et al. | 287—53 |
| 2,819,733 | 1/1958 | Maisch | 285—375 X |

CARL W. TOMLIN, *Primary Examiner.*

W. L. SHEDD, *Assistant Examiner.*